United States Patent
Blake et al.

(10) Patent No.: US 6,804,391 B1
(45) Date of Patent: Oct. 12, 2004

(54) PATTERN DETECTION METHODS AND SYSTEMS, AND FACE DETECTION METHODS AND SYSTEMS

(75) Inventors: Andrew Blake, Stapleford (GB); Sami Romdhani, Brussels (BE); Bernhard Schoelkopf, Cambridge (GB); Philip H. S. Torr, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 09/721,399

(22) Filed: Nov. 22, 2000

(51) Int. Cl.[7] ............................................... G06K 9/62
(52) U.S. Cl. ...................................... 382/159; 706/45
(58) Field of Search ................................ 382/115, 118, 382/155, 156, 158, 159, 160, 235, 227; 351/204; 700/47, 48; 128/925; 706/12–15, 20, 45

(56) References Cited

U.S. PATENT DOCUMENTS

| | | | |
|---|---|---|---|
| 5,649,068 A | 7/1997 | Boser et al. .................. | 395/23 |
| 5,950,146 A | 9/1999 | Vapnik ........................ | 702/153 |
| 6,134,344 A | * 10/2000 | Burges ........................ | 382/155 |
| 6,662,170 B1 | * 12/2003 | Dom et al. .................... | 706/45 |

OTHER PUBLICATIONS

Osuna et al., "Training Support Vector Machines: an Application to Face Detection", Proceedings of CVPR '97, Jun. 17–19, 1997, 8 pages.

Scholkopf et al., "Input Space Versus Feature Space in Kernel–Based Methods", IEEE Transactions on Neural Networks, vol. 10, No. 5, Sep. 1999, pp. 1000–1017.

Burges, "Simplified Support Vector Decision Rules", Bell Laboratories, Lucent Technologies, 7 pages.

Platt, "Sequential Minimal Optimization: A Fast Algorithm for Training Support Vector Machines", Microsoft Research Technical Report, Apr. 21, 1998, 21 pages.

Rowley et al., "Neural Network–Based Face Detection", IEEE 1996, pp. 203–208.

Rowley et al., "Neural Network–Based Face Detection", IEEE Transactions on Pattern Analysis and Machine Intelligence, vol. 20, No. 1, Jan. 1998, pp. 23–38.

Sung, "Example–Based Learning for View–Based Human Face Detection", IEEE Transactions on Pattern Analysis and Machine Intelligence, vol. 20, No. 1, Jan. 1998, pp. 39–51.

\* cited by examiner

*Primary Examiner*—Samir Ahmed
(74) *Attorney, Agent, or Firm*—Lee & Hayes, PLLC

(57) ABSTRACT

Systems and methods for object or pattern detection that use a nonlinear support vector (SV) machine are described. In the illustrated and described embodiment, objects or patterns comprising faces are detected. The decision surface is approximated in terms of a reduced set of expansion vectors. In order to determine the presence of a face, the kernelized inner product of the expansion vectors with the input pattern are sequentially evaluated and summed, such that if at any point the pattern can be rejected as not comprising a face, no more expansion vectors are used. The sequential application of the expansion vectors produces a substantial saving in computational time.

2 Claims, 8 Drawing Sheets

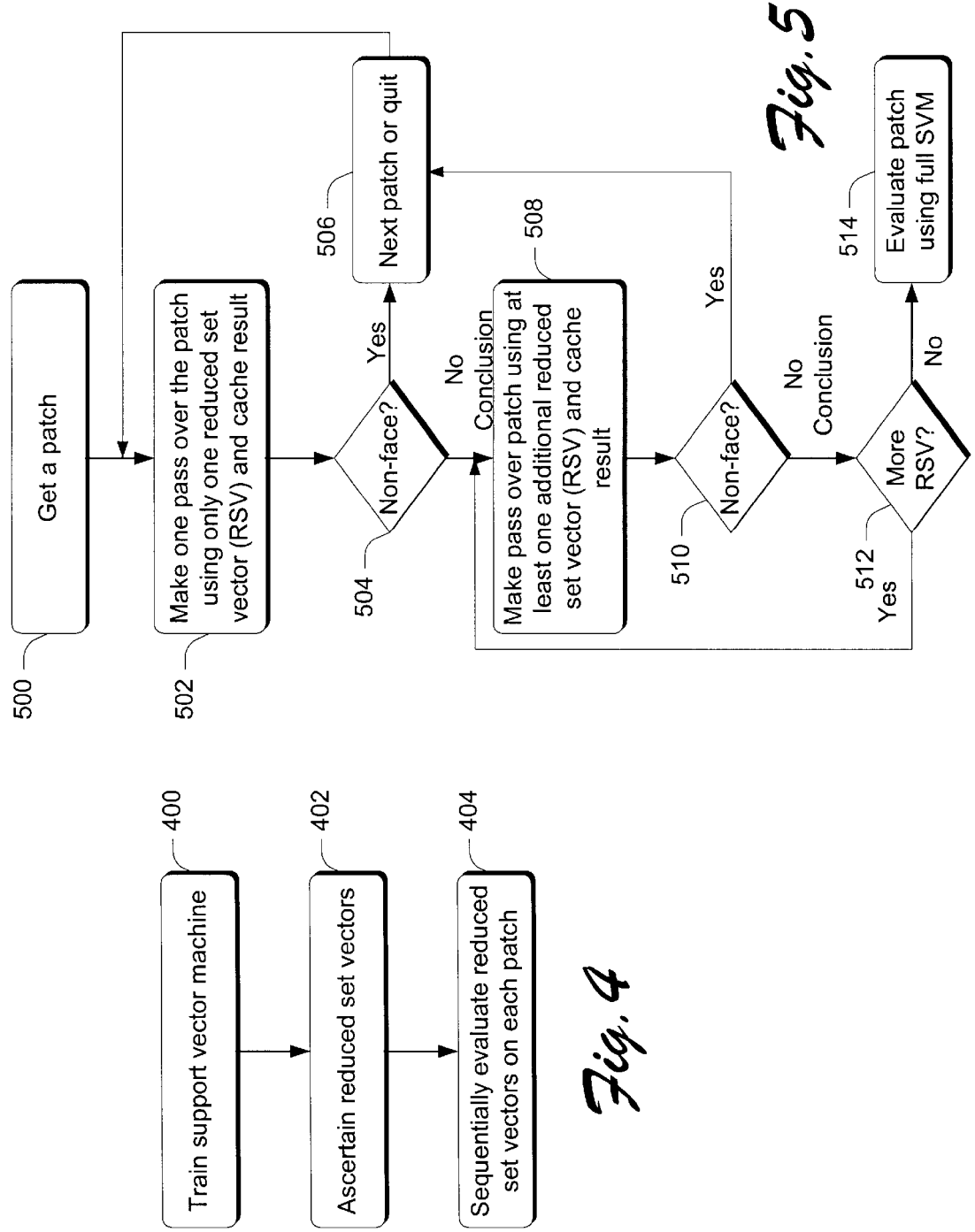

PATTERN DETECTION METHODS AND SYSTEMS, AND FACE DETECTION METHODS AND SYSTEMS

TECHNICAL FIELD

This invention relates to pattern detection methods and systems, and, more particularly, to face detection methods and systems.

BACKGROUND

In recent years, problems associated with general visual pattern recognition or object recognition/classification have received an increasing amount of attention in the computer vision community. In many cases the only feasible approach is to represent a class of patterns/objects (e.g. faces) by a set of learned examples. The complexity of some of the class of objects/patterns is often such that an extremely large set of examples is needed in order to learn all the potential variations (facial expression/pose etc). Additionally, typically the data points associated with the examples belong to some high-dimensional space. Thus, there has been and continues to be a need for pattern recognition techniques that can handle large data sets in high dimensional spaces.

One particular type of visual pattern is a face. Typically, face detection represents a very computationally intensive task that involves testing a digitized image for the location of a face by placing an observation window at all scales, in all positions, and at all orientations on the image, and ascertaining whether a face is present within the observation window. This process, however, can be quite slow. Exemplary face detection techniques are described in the following references, to which the reader is referred for additional material: Osuna et al., *Training support vector machines: An application to face detection*, Proc. Computer Vision and Pattern Recognition '97, pages 130–136, 1997; and Rowley et al., *Neural network-based face detection*, Proc. IEEE Conf. On Computer Vision and Pattern Recognition, pages 203–207, IEEE, 1996.

Nonlinear Support Vector Machines (SVMs) are known to lead to excellent classification accuracies on a wide range of tasks, including face detection. The following references describe non-linear SVMs and their various characteristics: Schölkopf et al., *Advances in Kernel Methods—Support Vector Learning*, MIT Press, Cambridge, Mass., 1999; and Vapnik, *The Nature of Statistical Learning Theory Statistical Learning Theory*, Springer, N.Y. 1995.

Nonlinear SVMs are, however, usually slower classifiers than neural networks. The reason for this is that their run-time complexity is proportional to the number of support vectors (SVs), i.e. to the number of training examples that the SVM algorithm utilizes in the expansion of the decision function. While it is possible to construct classification problems, even in high-dimensional spaces, where the decision surface can be described by two SVs only, it is normally the case that the set of SVs forms a substantial subset of the whole training set.

There has been a fair amount of research on methods for reducing the run-time complexity of SVMs. Exemplary articles includes the following: Burges, Simplified support vector decision rules, Proceedings, $13^{th}$ Intl. Conf. On Machine Learning, pages 71–77, San Mateo, Calif., 1996; and Schölkopf et al., *Input space vs. feature space in kernel-based methods*, IEEE Transactions on Neural Networks, 10(5):1000–1017, 1999. Yet, the run time complexity of SVMs continues to be an issue in their efficient employment for pattern recognition or classification.

Accordingly, this invention arose out of concerns associated with improving the systems and methods that are utilized for pattern recognition or classification. Particular concerns giving rise to the invention were those associated with improving the efficiencies with which the evaluation of support vector expansions is utilized for pattern classification, particularly where the patterns comprise faces.

SUMMARY

Systems and methods for object or pattern detection that use a nonlinear support vector (SV) machine are described. In the illustrated and described embodiment, objects or patterns comprising faces are detected. The decision surface (in the high dimensional data space) is approximated in terms of a reduced set of expansion vectors. In order to determine the presence of a face, the kernelized inner products of the reduced set vectors with the input pattern are sequentially evaluated and summed, such that if at any point the pattern can be rejected as not comprising a face, no more reduced set vectors are used. The sequential application of the reduced set vectors produces a substantial saving in computational time.

BRIEF DESCRIPTION OF THE DRAWINGS

FIG. 3 is a block diagram that describes a computer system that is suitable for use in implementing the described embodiment.

FIG. 4 is a flow diagram that describes steps in a method in accordance with the described embodiment.

DETAILED DESCRIPTION

Overview

Systems and methods for object or pattern detection that use a nonlinear support vector (SV) machine are described. In the illustrated and described embodiment, objects or patterns comprising faces are detected. The decision surface is approximated in terms of a reduced set of expansion vectors. In order to determine the presence of a face, the kernelized inner product of the expansion vectors with the input pattern are sequentially evaluated and summed, such that if at any point the pattern can be rejected as not comprising a face, no more reduced set vectors are used. The sequential application of the reduced set vectors produces a substantial saving in computational time. Advantageously, the reduced set vectors are applied in a predetermined order.

Exemplary System

Before the mathematics of the inventive approach are described, the following description is given to provide the reader with a conceptual understanding of the principles upon which the invented techniques rest.

Figure 1:
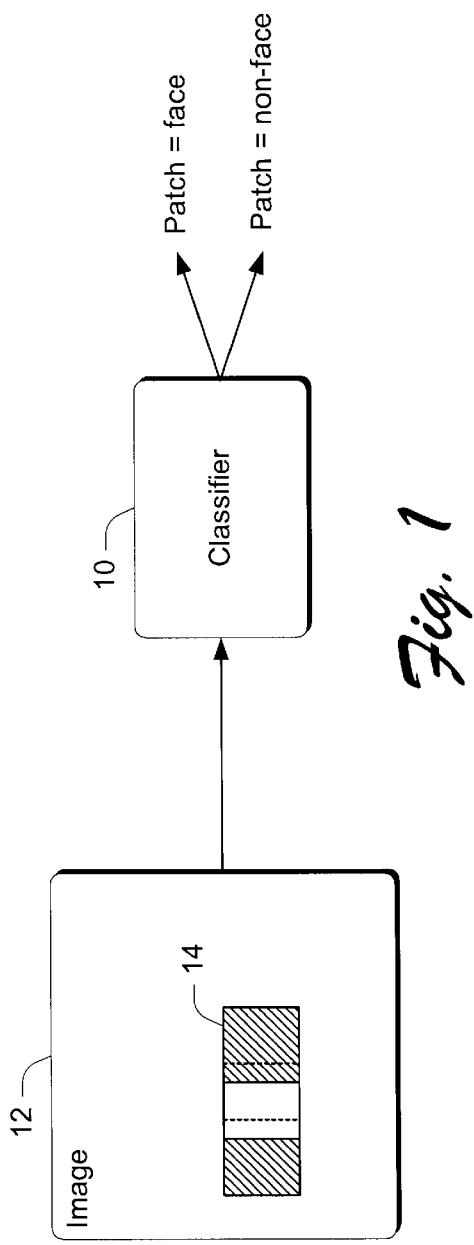
FIG. 1 is a diagram that illustrates the concept of an image and image patches in connection with a classifier, and is useful in understanding the described embodiment.

FIG. 1 shows an exemplary system known as a classifier 10 that is implemented as a support vector machine (SVM). Classifier 10 is typically implemented in software and is used to classify portions of a digitized image. The classifier is a trained learning machine that, based upon examples that are used to train the classifier, can make intelligent decisions about whether portions of a digitized image appear to be certain objects or patterns or not (e.g. faces and non-faces).

A digital image, such as the one shown at 12, is typically partitioned into individual n×n "patches" 14 which overlap. The overlapping patches 14 are then provided to classifier 10 which is programmed to ascertain whether a particular patch contains an object or pattern of interest. Throughout this document, faces are used as the exemplary objects or patterns. It is to be appreciated, however, that the classifier can be used to detect other objects or patterns.

Conceptually, classifier 10 is implemented as a SVM and works in the following way. Consider that each image patch is a 20×20 image patch. For each image patch, you want to determine whether the patch corresponds to a face or not. Each 20×20 image patch can be considered as a 400-dimensional vector. The idea is that for each of the 400-dimensional vectors (i.e. patches), you want to provide a classification output. To provide the classification output, each image patch has to be evaluated relative to a "space" that defines what is or is not a face.

Figure 2:
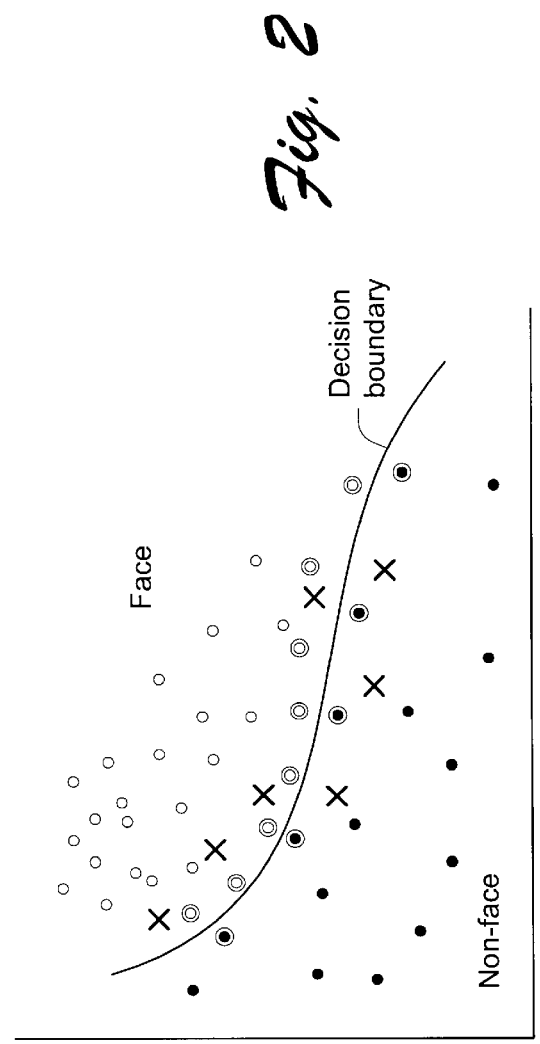
FIG. 2 is a graph that illustrates a 2-dimensional space having a number of points distributed therethrough in accordance with an example that is useful in understanding the principles upon which the described embodiment rests.

Consider, for example, FIG. 2 which shows an exemplary 2-dimensional space having a number of points distributed throughout. These points constitute a training set that is used to train the classifier 10 (FIG. 1) so that it can be used to determine what is and is not a face. The points consist of faces (open circles) and non-faces (solid circles) as designated. The idea is to find an accurate decision boundary between the points corresponding to the faces and non-faces such that each of the image patches can be evaluated, in terms of the decision boundary, to ascertain whether it is or it not a face. The SVM is the mechanism through which this boundary is found.

After the classifier 10 is trained, through techniques that will be understood by those of skill in the art, a number of points are identified as "support vectors". Typically, a large number of support vectors (e.g. 1000 or more) are identified. In the illustrated example, the support vectors are additionally encircled with a circle SO that support vectors on the "face" side of the decision boundary consist of an encircled open circle, while support vectors on the "non-face" side of the decision boundary consist of an encircled solid circle. Because there are typically many support vectors, and because each individual image patch has to be evaluated in terms of all of the support vectors if a full SVM is used, computational overhead is quite large and runtime complexity is very high.

To address this situation, processing techniques have evolved that rely on a so-called "reduced set method" which provides reduced set vectors. A reduced set construction can provide far fewer vectors that need to be evaluated for any one image patch. In the FIG. 2 illustration, the reduced set vectors are indicated as having a large "X". So then, to classify an image patch as a face or non-face using the reduced set method, far fewer vectors have to be evaluated. To date, though, all of the reduced set vectors are still evaluated, for each patch, to ascertain whether the patch is or is not a face. Although this technique reduces the complexity of using the full SVM, this is still more complex than desirable, particularly when considering runtime processing speed.

The mathematics of the SVM and reduced set method are discussed below in more detail.

Exemplary Computer System

FIG. 3 illustrates an example of a suitable computing environment 320 on which the inventive techniques described below can be implemented.

Exemplary computing environment 320 is only one example of a suitable computing environment and is not intended to suggest any limitation as to the scope of use or functionality of the described techniques. Neither should the computing environment 320 be interpreted as having any dependency or requirement relating to any one or combination of components illustrated in the exemplary computing environment 320.

The described techniques can be operational with numerous other general purpose or special purpose computing system environments or configurations. Examples of well known computing systems, environments, and/or configurations that may be suitable for use with the described techniques include, but are not limited to, personal computers, server computers, thin clients, thick clients, hand-held or laptop devices, multiprocessor systems, microprocessor-based systems, programmable consumer electronics, network PCs, minicomputers, mainframe computers, distributed computing environments that include any of the above systems or devices, and the like.

The described techniques can be described in the general context of computer-executable instructions, such as program modules, being executed by a computer. Generally, program modules include routines, programs, objects, components, data structures, etc. that perform particular tasks or implement particular abstract data types. The described techniques can also be practiced in distributed computing environments where tasks are performed by remote processing devices that are linked through a communications network. In a distributed computing environment, program modules can be located in both local and remote computer storage media including memory storage devices.

As shown in FIG. 3, the computing environment 320 includes a general-purpose computing device in the form of a computer 330. The components of computer 320 can include, by are not limited to, one or more processors or processing units 332, a system memory 334, and a bus 336 that couples various system components including the system memory 334 to the processor 332.

Bus 336 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 330 typically includes a variety of computer readable media. Such media can be any available media that is accessible by computer 330, and includes both volatile and non-volatile media, removable and non-removable media.

In FIG. 3, the system memory includes computer readable media in the form of volatile memory, such as random access memory (RAM) 340, and/or non-volatile memory, such as read only memory (ROM) 338. A basic input/output system (BIOS) 342, containing the basic routines that help to transfer information between elements within computer 330, such as during start-up, is stored in ROM 338. RAM 340 typically contains data and/or program modules that are immediately accessible to and/or presently operated on by processor 332.

Computer 330 can further include other removable/non-removable, volatile/non-volatile computer storage media. By way of example only, FIG. 3 illustrates a hard disk drive 344 for reading from and writing to a non-removable, non-volatile magnetic media (not shown and typically called a "hard drive"), a magnetic disk drive 346 for reading from and writing to a removable, non-volatile magnetic disk 348 (e.g., a "floppy disk"), and an optical disk drive 350 for reading from or writing to a removable, non-volatile optical disk 352 such as a CD-ROM, DVD-ROM or other optical media. The hard disk drive 344, magnetic disk drive 346, and optical disk drive 350 are each connected to bus 336 by one or more interfaces 354.

The drives and their associated computer-readable media provide nonvolatile storage of computer readable instructions, data structures, program modules, and other data for computer 330. Although the exemplary environment described herein employs a hard disk, a removable magnetic disk 348 and a removable optical disk 352, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 348, optical disk 352, ROM 338, or RAM 340, including, by way of example, and not limitation, an operating system 358, one or more application programs 360, other program modules 362, and program data 364.

A user can enter commands and information into computer 330 through input devices such as keyboard 366 and pointing device 368 (such as a "mouse"). Other input devices (not shown) may include a microphone, joystick, game pad, satellite dish, serial port, scanner, or the like. These and other input devices are connected to the processing unit 332 through an user input interface 370 that is coupled to bus 336, but may be connected by other interface and bus structures, such as a parallel port, game port, or a universal serial bus (USB).

A monitor 372 or other type of display device is also connected to bus 336 via an interface, such as a video adapter 374. In addition to the monitor, personal computers typically include other peripheral output devices (not shown), such as speakers and printers, which may be connected through output peripheral interface 375.

Computer 330 may operate in a networked environment using logical connections to one or more remote computers, such as a remote computer 382. Remote computer 382 may include many or all of the elements and features described herein relative to computer 330.

Logical connections shown in FIG. 3 are a local area network (LAN) 377 and a general wide area network (WAN) 379. Such networking environments are commonplace in offices, enterprise-wide computer networks, intranets, and the Internet.

When used in a LAN networking environment, the computer 330 is connected to LAN 377 network interface or adapter 386. When used in a WAN networking environment, the computer typically includes a modem 378 or other means for establishing communications over the WAN 379. The modem 378, which may be internal or external, may be connected to the system bus 336 via the user input interface 370, or other appropriate mechanism.

Depicted in FIG. 3, is a specific implementation of a WAN via the Internet. Over the Internet, computer 330 typically includes a modem 378 or other means for establishing communications over the Internet 380. Modem 378, which may be internal or external, is connected to bus 336 via interface 370.

In a networked environment, program modules depicted relative to the personal computer 330, or portions thereof, may be stored in a remote memory storage device. By way of example, and not limitation, FIG. 3 illustrates remote application programs 389 as residing on a memory device of remote computer 382. It will be appreciated that the network connections shown and described are exemplary and other means of establishing a communications link between the computers may be used.

FIG. 3 illustrates an example of a suitable operating environment 320 in which the described techniques can be implemented. Specifically, the described techniques can be implemented by any program 360–362 or operating system 358 in FIG. 3.

The operating environment is only an example of a suitable operating environment and is not intended to suggest any limitation as to the scope of use of functionality of the described techniques. Other well known computing systems, environments, and/or configurations that may be suitable for use with the described techniques include, but are not limited to, personal computers, server computers, hand-held or laptop devices, multiprocessor systems, microprocessor-based systems, programmable consumer electronics, wireless communications equipment, network PCs, minicomputers, mainframe computers, distributed computing environments that include any of the above systems or devices, and the like.

An implementation of the described techniques can be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the described techniques can be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The Support Vector Algorithm

Support vector machines (SVMs) are known and are universal learning machines whose decision surface is parameterized by a set of support vectors (as diagrammatically indicated in FIG. 2), and by a set of corresponding weights. An SVM is also characterized by a kernel function. Choice of the kernel determines whether the resulting SVM is a polynomial classifier, a two-layer neural network, a radial basis function machine, or some other learning machine.

Support vector classifiers implicitly map the data $(x_1,y_1), \ldots ,(x_l,y_l) \in \chi \times \{\pm 1\}$ (in our case, $\chi \subset \Re^N$) into a dot product space F via a (usually nonlinear) map $\Phi: \chi \rightarrow F$, $x \mapsto \Phi(x)$. F is often referred to as the "feature space". Although F can be high-dimensional, it is usually not necessary to explicitly work in that space.

There exists a class of kernels $k(x,x')$ which can be shown to compute the dot products in associated feature spaces, i.e. $k(x,x')=(\Phi(x)\cdot\Phi(x'))$. The support vector algorithm computes a hyperplane which separates the data in F by a large margin. Once this geometrical problem is cast in terms of dot products, the kernel operation is used, and thus all computations in F are reduced to the evaluation of the kernel, as will be appreciated by those of skill in the art. It can be shown that the resulting training problem consists of computing (for some positive value of the parameter C determining the trade-off between margin maximization and training error minimization):

$$\max_{\alpha} \sum_{i=1}^{l} \alpha_i - \frac{1}{2} \sum_{i,j=1}^{l} \alpha_i \alpha_j y_i y_j k(x_i, x_j)$$ Equation 1 subject to $$0 \le \alpha_i \le C, \quad i = 1, \ldots, l, \sum_{i=1}^{l} \alpha_i y_i = 0,$$ Equation 2 and that the solution has an expansion:

$$f(x) = sgn\left(\sum_{i=1}^{l} \alpha_i y_i k(x, x_i) + b\right).$$ Equation 3

Those training examples $x_i$ with $\alpha_i > 0$ are called Support Vectors.

Kernels commonly used include polynomials $k(x,x')=(x\cdot x')^d$, which can be shown to map into a feature space spanned by all order d products of input features, and the Gaussian RBF kernel $$k(x, x') = \exp\left(\frac{-\|x - x'\|^2}{2\sigma^2}\right).$$ Equation 4

Performance-wise, they have been found to do similarly well. In the presently-described embodiment, we focus on the latter of the two.

Computing Fast Support Vector Expansions

Assume we are given a vector $\Psi \in F$, expanded in images of input patterns $x_i \in \chi$, $$\Psi = \sum_{i=1}^{N_x} \alpha_i \Phi(x_i),$$ Equation 5 with $\alpha_i \in \Re$, $x_i \in \chi$. To reduce the complexity of evaluating it, one can approximate it by a reduced set expansion $$\Psi' = \sum_{i=1}^{N_z} \beta_i \Phi(z_i),$$ Equation 6 with $N_z \ll N_x$, $\beta_i \in \Re$, and reduced set vectors $z_i \in \chi$. To this end, one can minimize as follows:

$$\|\Psi - \Psi'\|^2 = \sum_{i,j=1}^{N_x} \alpha_i \alpha_j k(x_i, x_j) + \sum_{i,j=1}^{N_z} \beta_i \beta_j k(z_i, z_j) - 2\sum_{i=1}^{N_x}\sum_{j=1}^{N_z} \alpha_i \beta_j k(x_i, z_j).$$ Equation 7

This approach is known as the "reduced set method". The key point of the reduced set method is that although $\Phi$ is not given explicitly, Equation 7 can be computed (and minimized) in terms of the kernel, as will be understood by those of skill in the art.

The sequential approach used here requires an extension of the reduced set method, to compute a whole sequence of reduced set approximations $$\Psi'_m = \sum_{i=1}^{m} \beta_{m,i} \Phi(z_i) \qquad \text{Equation 8}$$

for m=1, . . . , $N_z$. The reduced set vectors $z_i$ and the coefficients $\beta_i$ are computed by iterative optimization as in Schölkopf et al., *Input space vs. feature space in kernel-based methods*, IEEE Transactions on Neural Networks, 10(5):1000–1017, 1999.

For the first vector, we need to approximate $\Psi = \sum_{i=1}^{N_x} \alpha_i \Phi(x_i)$ by $\Psi' = \beta \Phi(z)$ minimizing the distance $\|\Psi - \Psi'\|^2$ between $\Psi$ and $\Psi'$, with respect to z, β, to give the first reduced set vector $z_1$ and its coefficient $\beta_{1,1}$ using a method described in Schölkopf et al., *Input space vs. feature space in kernel-based methods*, IEEE Transactions on Neural Networks, 10(5):1000–1017, 1999.

Recall that the aim of the reduced set algorithm is to approximate a vector $\Psi$ as in Equation 5, by an expansion of the type in Equation 6, with $N_z > 1$. The required higher order reduced set vectors $z_i$, i>1 and their coefficients $\beta_i$, are obtained in recursive fashion by defining a residual vector $$\Psi_m = \Psi - \sum_{i=1}^{m-1} \beta_{m-1,i} \Phi(z_i), \qquad \text{Equation 9}$$

Where $\Psi$ is the original feature-space vector defined in Equation 5. Then the procedure for obtaining the first reduced set vector $z_1$ is repeated, now with $\Psi_m$ in place of $\Psi$ to obtain $z_m$. However, the optimal β from this step is not used. Instead, optimal $\beta_{m,i}$, i=1, . . .,m are computed jointly as in Schölkopf et al., *Input space vs. feature space in kernel-based methods*, IEEE Transactions on Neural Networks, 10(5):1000–1017, 1999.

Thresholds

For any $N_z$, the obtained expansion can be plugged into the SVM decision function (Equation 3) to yield f(x)=sgn $(\sum_{j=1}^{N_z} \beta_j k(x,z_j) + b)$. It is, however, not optimal to simply re-use the offset b stemming from the original SV machine. Reduced set approximations of decision functions can be improved by recomputing the thresholds by based on the training set, or some validation set (as in Schölkopf et al., *Input space vs. feature space in kernel-based methods*, IEEE Transactions on Neural Networks, 10(5):1000–1017, 1999), to get $$f_{N_z}(x) = sgn\left(\sum_{j=1}^{N_z} \beta_j k(x, z_j) + b_{N_z}\right). \qquad \text{Equation 10}$$

This is especially true in the present setting, as will become clear in the following.

Face Detection by Sequential Evaluation

In the illustrated and described embodiment, a training set of face and non-face 20×20 image patches is used to train the SVM. At detection time, each pixel of an input image is a potential face center, hence the whole set of 20×20 overlapping patches surrounding each pixel must be evaluated. To detect faces at different scales an image pyramid is constructed. If w and h are the width and the height, respectively, of the input image and L and s the number of subsampling levels and the subsampling rate, respectively, the total number of patches to be evaluated is $N_p = \sum_{l=1}^{L} whs^2$ (l-1). Evaluating the full SVM, or even the whole set of reduced set vectors on all patches would be undesirably slow. A large portion of the patches can, however, be easily classified using only a few reduced set vectors. Accordingly, the inventive technique about to be described can use less than all of the reduced set vectors to make a classification as to whether a patch is a face or a non-face.

Consider that, in the past and in accordance with the reduced set method, there may be 300 or so reduced set vectors after the processing described above. Each of these 300 or so reduced set vectors would have to be evaluated for each patch to classify the patch as a face or a non-face. This is very computationally intensive and slows the runtime classification process. In accordance with the inventive techniques about to be described, a first reduced set vector is used to test the patch to determine whether it can be classified as a face or a non-face. If it can be classified as a non-face, then the processing for that particular patch terminates and the next patch is tested. If, however, the first reduced set vector cannot classify the patch as a non-face, the first and second reduced set vectors are utilized to attempt to classify the patch as either a face or a non-face. Note that the result of applying the first reduced set vector can be stored in memory, so that the second pass only consists of evaluating the second reduced set vector. Processing continues until either, (1) the patch is classified as a non-face by using less than all of the reduced set vectors, or (2) the full SVM is applied on the patch, using Equation 3 above. If the evaluation is positive, the patch is classified as a face.

FIG. 4 is a flow diagram that describes steps in a method in accordance with the described embodiment. The method can be implemented in any suitable hardware, software, firmware, or combination thereof. Step 400 trains the support vector machine. Any suitable training techniques can be used. In the illustrated and described embodiment, training of the SVM can take place as described above. Note that this step can also involve retraining the SVM. For example, if the SVM misidentifies a face as a non-face, then the retraining of the SVM corrects this misidentification. Step 402 ascertains or calculates a collection of reduced set vectors. The mathematics of how this can be done is given above, and will be understood by those of skill in the art. It will be appreciated that the process by which the reduced set vectors are calculated orders them in a predetermined way. This predetermined ordering of the reduced set vectors is a direct manifestation of the way in which the reduced set vectors are calculated. Step 404 sequentially evaluates the reduced set vectors on each patch. In one implementation, the sequential evaluation of the reduced set vectors uses the vectors in their predetermined ordering. If one or more of the reduced set vectors can classify a patch as a non-face, then the process for that patch terminates. Accordingly, the runtime complexity of classification process can be dramatically reduced. For example, if only one reduced set vector can classify a patch as a non-face, then the processing associated with evaluating the remainder of the reduced set vectors for that patch can be eliminated.

Figure 5:
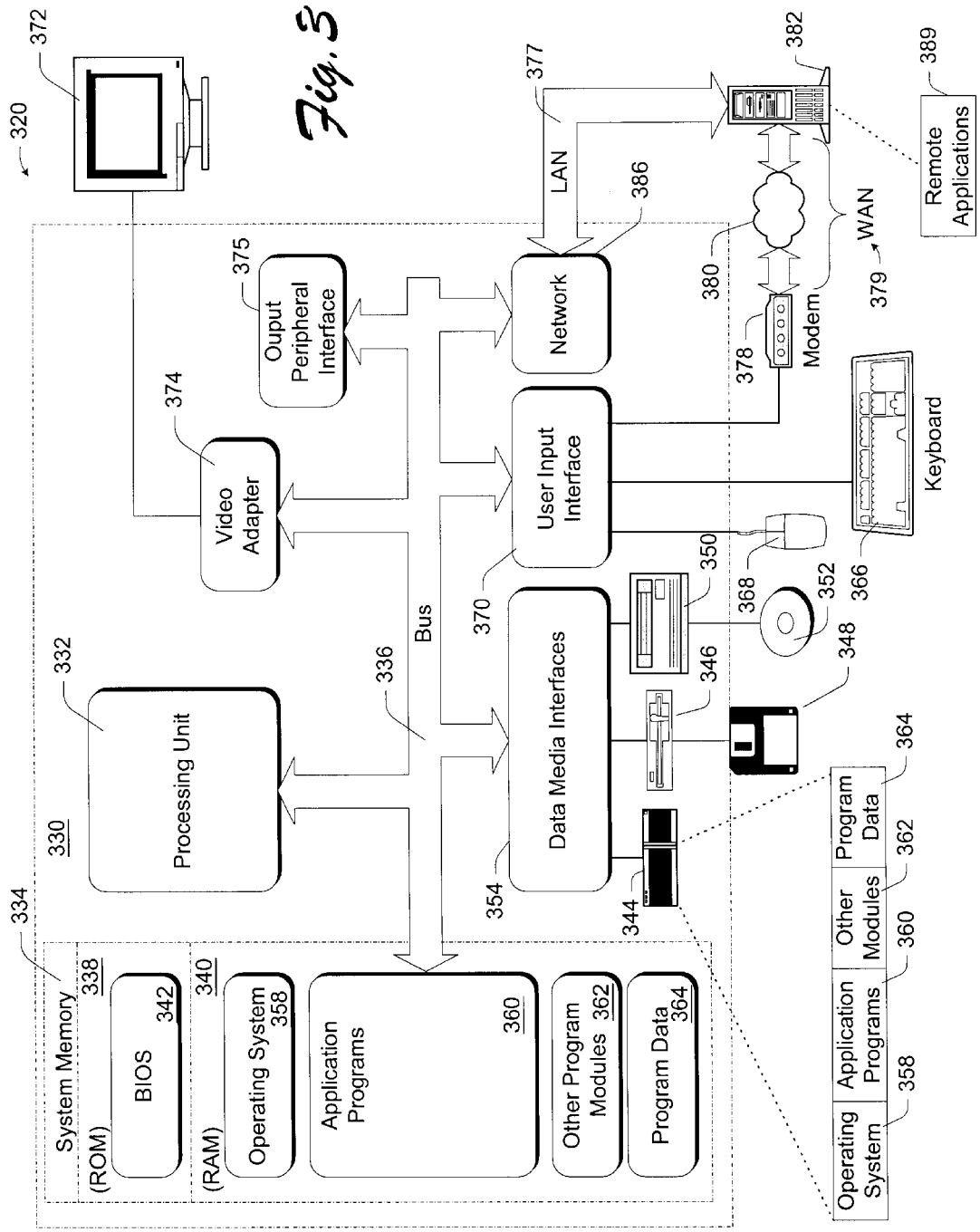
FIG. 5 is a flow diagram that describes steps in a method in accordance with the described embodiment.

FIG. 5 is a flow diagram that describes, in somewhat more detail, the sequential evaluation of reduced set vectors, in accordance with the described embodiment. Step 500 gets one of a number of images patches that are to be evaluated. Step 502 makes a first pass over;the patch using only one reduced set vector for purposes of ascertaining whether $he patch can be classified as a non-face. If, at step 504, the patch can be classified as a non-face, step 506 gets the next patch and returns to step 502, or quits if there are no more patches to evaluate. If, on the other hand, step 504 is not able to classify the patch as a non-face (i.e. no conclusion can be made), step 508 makes a pass over the patch using at least one additional reduced set vector. Note that the results of applying the previous reduced set vectors can be cached so that only the next reduced set vector(s) need to be applied. Step 510 ascertains whether this pass can classify the patch as a non-face. If it can, the method branches to step 506. If, however, step 510 cannot classify the patch as a non-face (i.e. no conclusion), then step 512 ascertains whether there are any additional reduced set vectors to use in the evaluation. If there are, the method returns to step 508 and makes another pass over the patch using at least one additional reduced set vector. If, on the other hand, no more reduced set vectors are available for use, step 514 evaluates the patch using the full support vector machine.

Mathematically, this can be represented by the following steps:

1. Set a hierarchy level to m=1, where m represents the number of reduced set vectors that are being used.
2. Evaluate $y_m = \text{sgn}(\Sigma_{j=1}^m \beta_{m,j} K_j + b_m)$, where $K_j = k(x, z_j)$.
3. If $y_m < 0$, x is classified as a non-face and the algorithm stops; if $y_m \geq 0$, m is incremented. If $m = N_z$ the algorithm stops, otherwise evaluation continues as in Step 2.
4. If $y_j \geq 0$ and $j = N_z$, the full SVM is applied on the patch x, using Equation 3 above. If the evaluation is positive, the patch is classified as a face.

One primary useful feature of this approach is that on average, relatively few kernels $K_j$ have to be evaluated at any given image location—i.e., for most patches, the algorithm above stops at a level $j << N_z$. This speeds up the algorithm relative to the full reduced set (by more than an order of magnitude in the face classification experiments reported below). Note that in the case of gaussian kernels, the application of one reduced set vector amounts to a simple template matching operation.

Setting Offsets

The offsets $b_m$ are fixed to obtain a desired point on the R.O.C. curve for the overall sequential scheme. Suppose an overall false negative rate $\upsilon$ is required, then, given a "decay rate" $\alpha$, we express $\upsilon$ as a geometric series by setting false negative rates $\upsilon_m$ for the mth level in the hierarchy to $\upsilon_j = \alpha \upsilon_{j-1}$ where $\upsilon_1 = \upsilon(1-\alpha)$. Now each $b_m$ is fixed to achieve the desired $\upsilon_m$ over a validation set. The free parameter a can now be set to maximize the overall true positive rate over the validation set. It is to be appreciated and understood that the described method of setting offsets, i.e. moving the decision boundary within the space that defines the faces and non-faces, can be accomplished in other ways.

Experimental Results

Initially the SVM was trained on 3600 frontal faces and 25000 non-face examples using Platt's Sequential Minimal Optimisation set forth in Platt, *Fast training of support vector machines using sequential minimal optimization*, In Schölkopf et al., *Advances in Kernel Methods-Support Vector Learning*, pages 185–208, Cambridge, Mass., 1999, MIT Press. The kernel used was Gaussian (Equation 4) with a standard deviation $\sigma$ of 3.5. The trade-off between margin maximization and training error minimization was set to C=1.

The non-face patches were taken randomly on a set of 1000 images containing no faces. To improve the performance of the classifier, a second bout of training was initiated: To decrease the number of false positives, the face detector was applied on a new set of 100 images which did not contain any faces. This generated 110000 false positive patches which were then added to the training. The SVM was then retrained.

Figure 6:
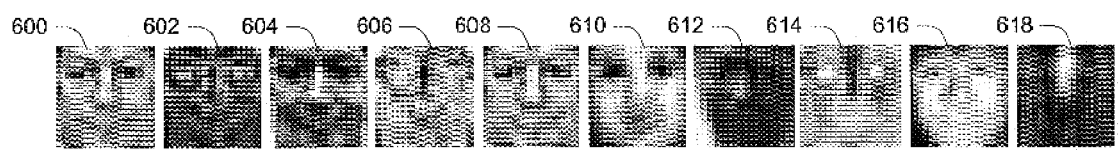
FIG. 6 is a diagram that illustrates exemplary reduced set vectors.

The SVM selected 1742 support vectors. These were subsequently decreased to 60 reduced set vectors. The first ten reduced set vectors are shown in FIG. 6 at 600–618. Note that all vectors can be interpreted as either faces (e.g. the first one) or anti-faces (e.g. the second one).

Speed Improvement

Figure 7:
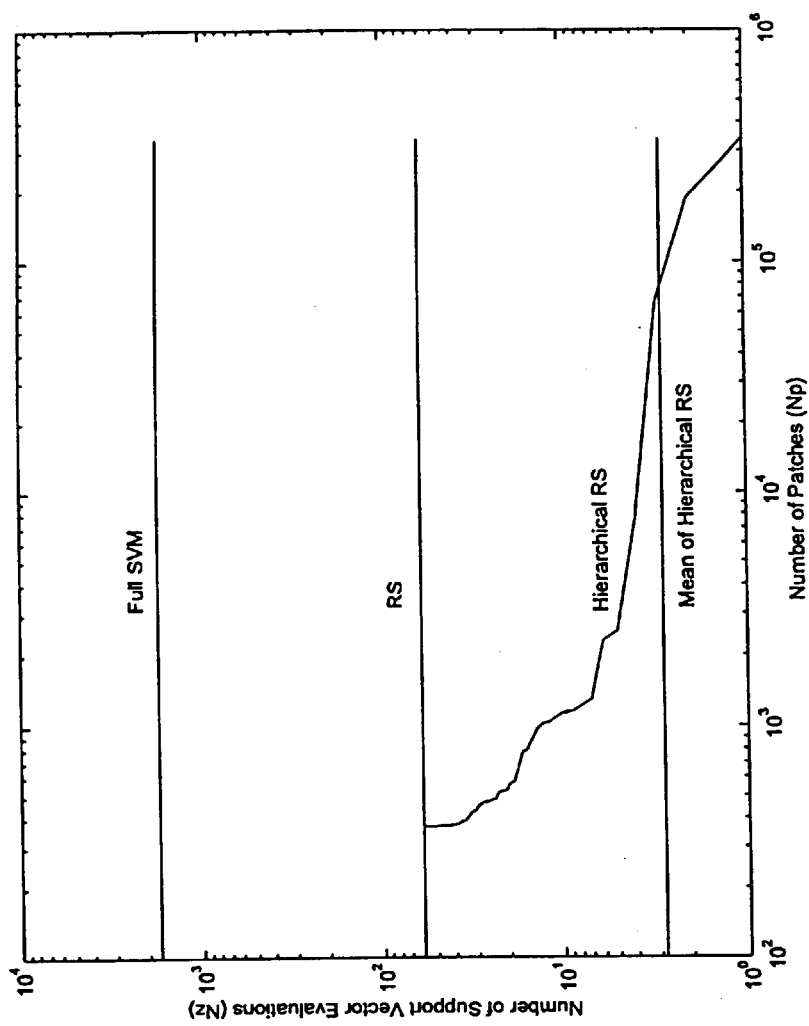
FIG. 7 is a graph that describes the number of reduced set vectors that were utilized to evaluate a patch for a full support vector machine, a reduced set vector machine, and a vector machine in accordance with the described embodiment.

At detection time, due to the sequential evaluation of the patches, very few reduced set vectors are applied. FIG. 7 shows the number of reduced set vectors evaluated per patches for different methods (SVM, RSM and SRSM (Sequential Reduced Set Machine)). The Full SVM and the RSM evaluate all their support or reduced set vectors on all the patches, while the SRSM uses on average only 2.8 reduced set vectors.

Figure 8:
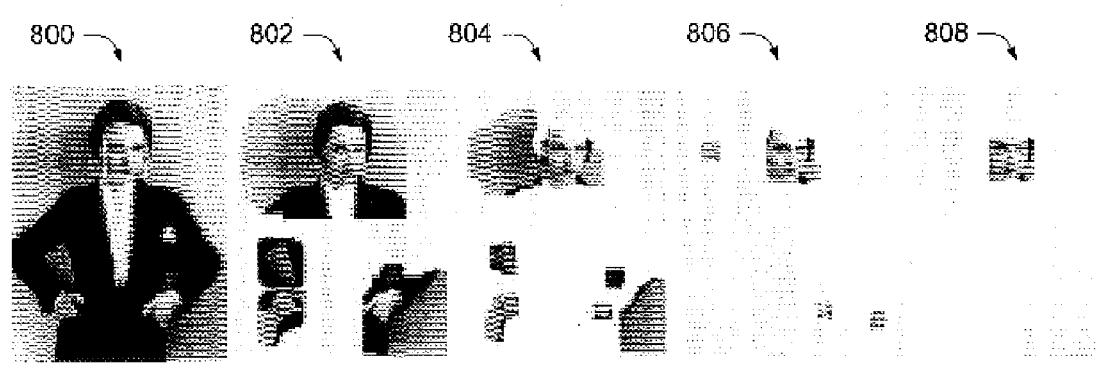
FIG. 8 is an illustration that shows the patches of an input image that remain after 1, 10, 20, and 30 sequential reduced set evaluations in accordance with the described embodiment.

FIG. 8 shows the patches of an input image which remain after 1, 10, 20 and 30 sequential reduced set evaluations respectively at 800, 802, 804, 806, and 808.

Figure 9:
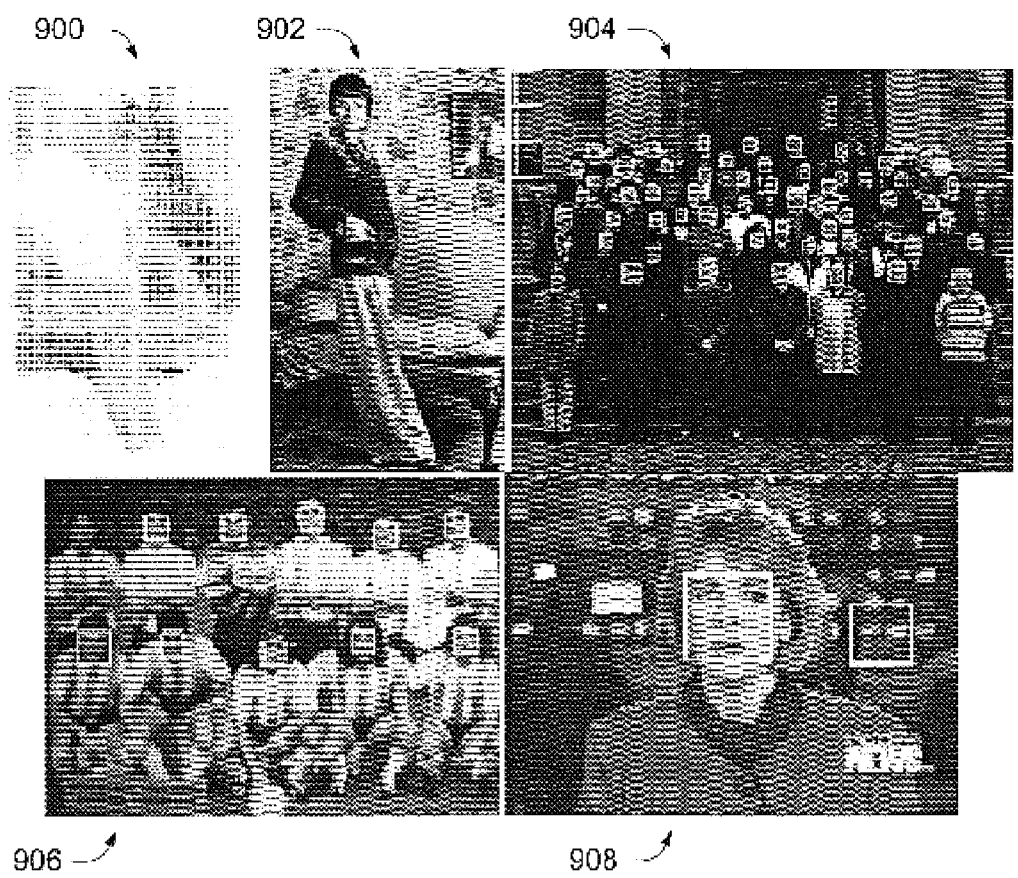
FIG. 9 is an illustration that is useful in understanding certain principles of the described embodiment.

FIG. 9 shows the number of reduced set vectors used to classify each patch of an image. The grey-level values of the pixels of the right image are proportional to the number of reduced set vectors used to classify the corresponding spot in the left image (note that the grey values are displayed at the center of the corresponding patches only). The uniform parts of the input image are easily rejected using a single reduced set vector, whereas the cluttered background requires more reduced set vectors. Note that very few patches needed all the reduced set vectors (only the patches containing the faces used all the reduced set vectors). The grey-level values of the pixels of image 900 are proportional to the number of reduced set vectors used to classify their associated patches of image 902. Light grey corresponds to the use of a single reduced vector, black to the use of all the vectors. Image 902 is a 153×263 image that contains 76,108 patches and was detected in 2.58 seconds. Image 904 is a 1280×1024 image that contains 2,562,592 patches and was detected in 80.1 seconds. Image 906 is a 601×444 image containing 518,801 patches detected in 27.9 seconds. Image 908 is a 320×240 image containing 147,289 patches detected in 10.4 seconds.

Accuracy

Figure 10:
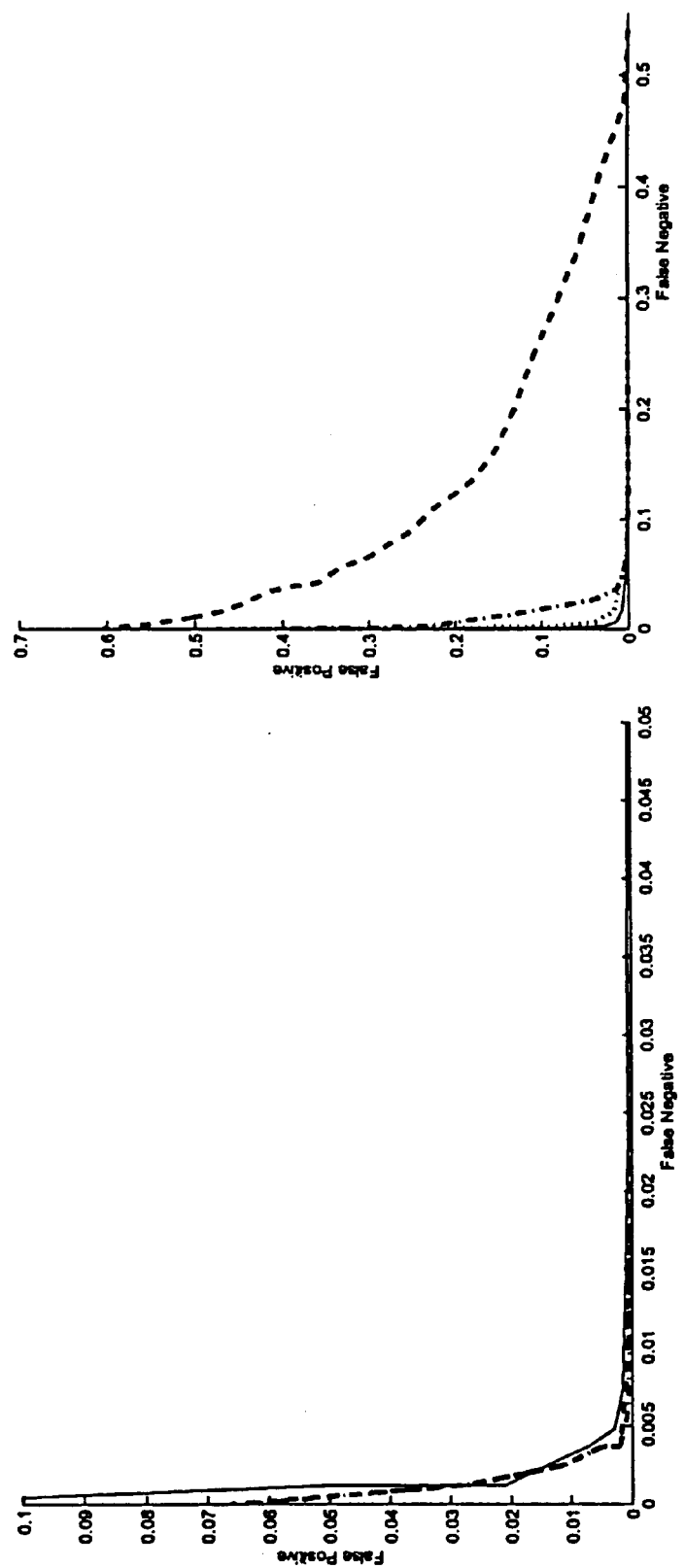
FIG. 10 shows two graphs that compare the accuracy of different detection methods.

FIG. 10 shows a comparison of the accuracy of the different methods. These R.O.C. were computed on a test set containing 800 faces and 5000 non-faces. The accuracy of the SRSM (60 reduced set vectors) is very similar to the accuracy of the full SVM (1742 support vectors) and the RS (60 reduced set vectors) which perform equally well. In the leftmost graph of the figure, the R.O.C. for the SVM using 1742 support vectors is shown by the dotted line, the RS using 60 reduced vectors is shown by the dashed line, and the SRSM using also 60 reduced set vectors is shown by the solid line. Note that the SVM and RS curves are so close that they are not distinguishable. In the rightmost graph of the figure, the R.O.C. for an SRSM using one (dashed line), two (dash-dot line), three (dotted line) and four (solid line) reduced set vectors.

Results

To test this system, we used the Rowley et al. test set (Rowley et al., *Neural network-based face detection*, pami, 20:23–38, 1998 (which also includes test images from Sung et al. (*Proceedings from Image Understanding Workshop*, Monterey, Calif. November 1994) and Osuna et al. (*Training support vector machine: An application to face detection*, Proc. Computer Vision and Pattern Recognition '97, pages 130–136, 1997.

This set consists of 130 images containing 507 faces. We used a subsampling ratio of s=0.7, and the input images were subsampled as long as their width and height was larger than 20 (i.e. the number of levels in the subsampling pyramid is $$\min\left(\text{floor}\left(\frac{\log(20/w)}{\log 0.7}\right), \text{floor}\left(\frac{\log(20/h)}{\log 0.7}\right)\right),$$

where w and h are, respectively, the width and the height of the input image). We obtained a detection rate of 75.1% with a false detection rate of 0.001%.

Conclusion

Pattern detection systems usually have to scan large images. Therefore, the greatest challenge in engineering systems for real-world applications is that of reducing computational complexity. The inventive embodiment described above provides demonstrated computational savings in classification by the use of a sequential reduced set vector evaluation.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable media having computer-readable instructions thereon which, when executed by a computer, cause the computer to:

calculate a plurality of reduced set vectors that are to be used to classify various image patches as being a non-face, the plurality of reduced set vectors being arranged in a predetermined order that is established by the process through which the reduced set vectors were calculated;

use less than all of the reduced set vectors to classify an individual image patch of the plurality of image patches by applying a fist reduced set vector in an attempt to classify the individual image patch and, if successful, not applying any additional reduced set vectors;

if application of the first reduced set vector is unsuccessful in classifying the image patch, apply both the first reduced set vector and at least one additional reduced set vector in an attempt to classify the individual image patch; and if, after application of all of the reduced set vectors, the image patch is not classified, then use a fill support vector machine to classify the image patch.

2. One or more computer-readable media having computer-readable instructions thereon which, when executed by a computer, cause the computer to:

make a first pass over an image patch using only one reduced set vector of a number of possible reduced set vectors;

ascertain from said first pass, whether the image patch can be classified as a non-face;

classify the image patch as a non-face, if the image patch can be classified using the one reduced set vector without using any additional reduced set vectors for the image patch; and if the image patch cannot be classified as a non-face using the one reduced set vector:

make at least one additional pass over the image patch using at least one additional reduced set vector; and ascertain from said at least one additional pass, whether the image patch can be classified as a non-face; and if the image patch cannot be classified as a non-face using said at least one additional reduced set vector, continue to make additional passes over the image patch using additional reduced set vectors until either: (1) the image patch can be classified as a non-face, or (2) there are no additional reduced set vectors to use; and if there are no additional reduced set vectors to use, use a full support vector machine to classify the image patch as either a face or a non-face.

* * * * *